Aug. 9, 1927.
J. P. BALDWIN
SHOCK ABSORBER
Filed Dec. 27, 1921
1,638,232
2 Sheets-Sheet 1
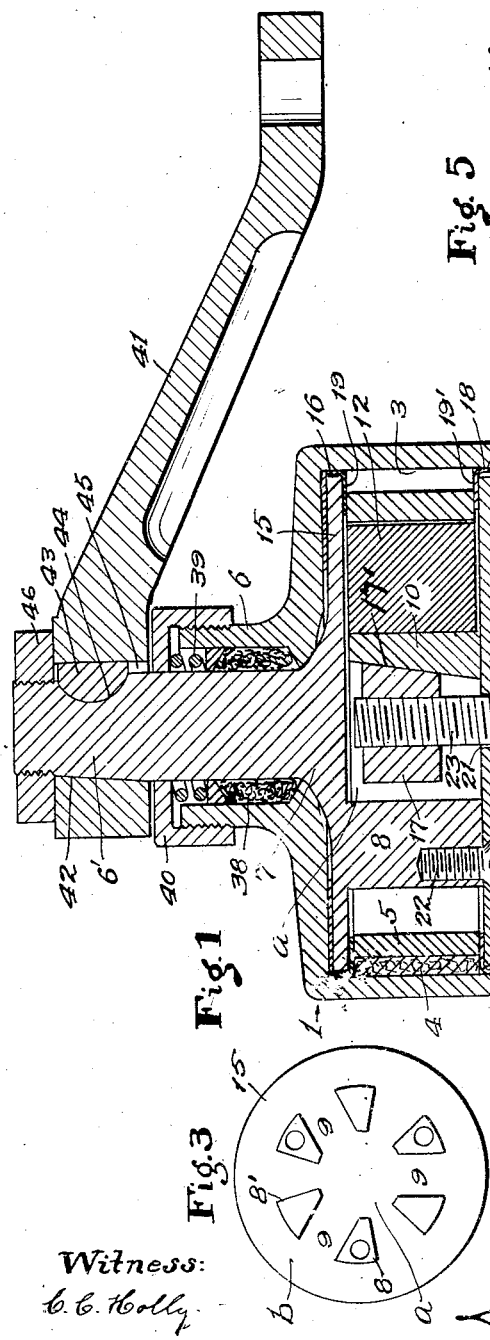
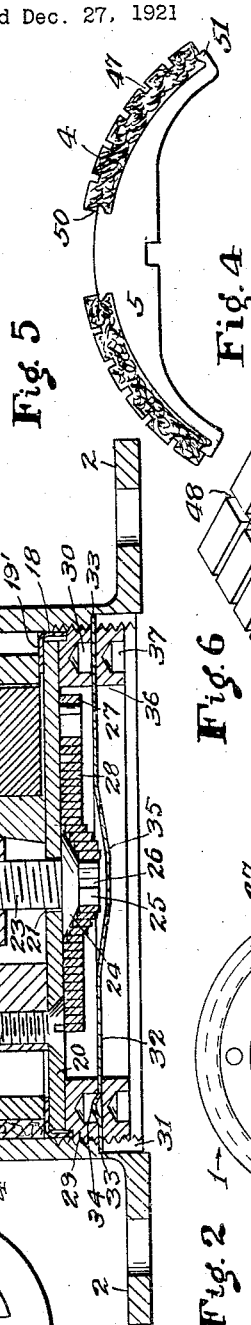
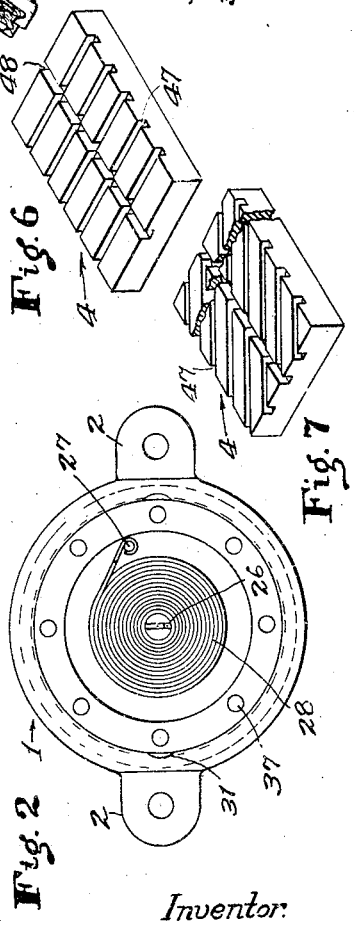
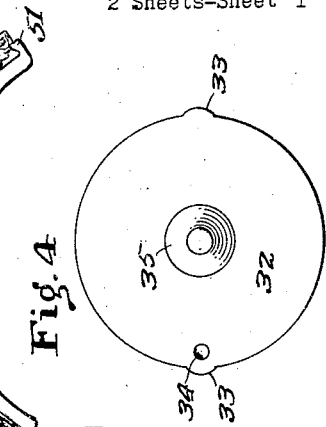
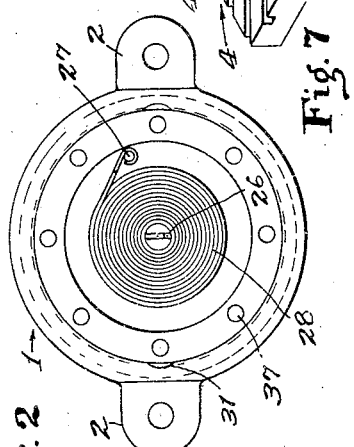
Witness:
C. C. Holly
Inventor:
James Pierce Baldwin
by James R. Townsend
his atty.

Aug. 9, 1927.
J. P. BALDWIN
SHOCK ABSORBER
Filed Dec. 27, 1921
1,638,232
2 Sheets-Sheet 2
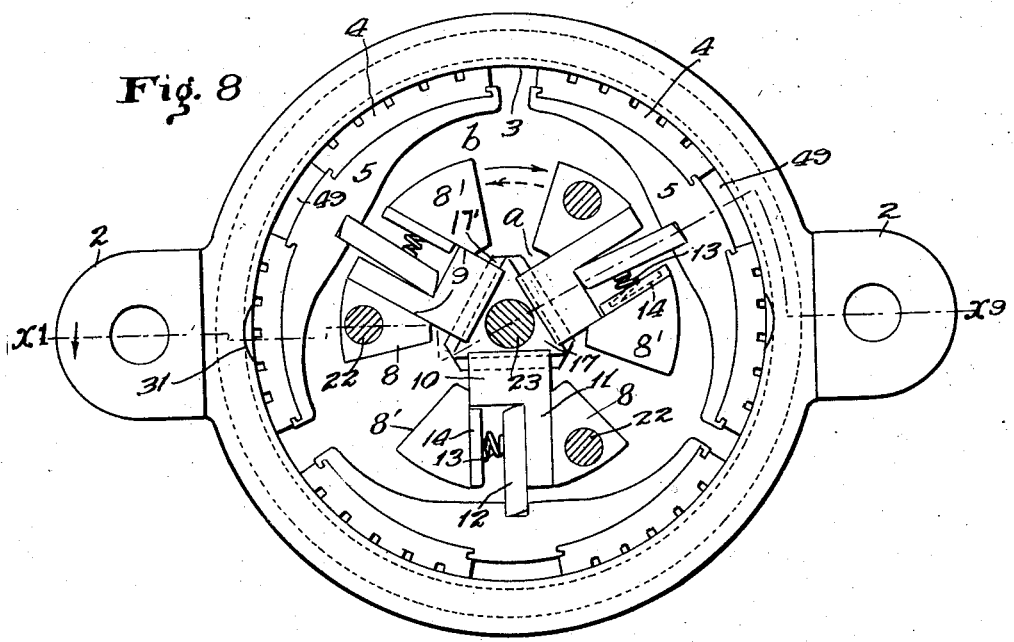
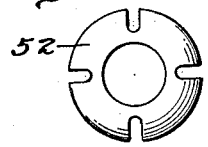
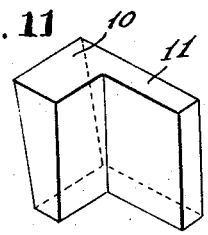
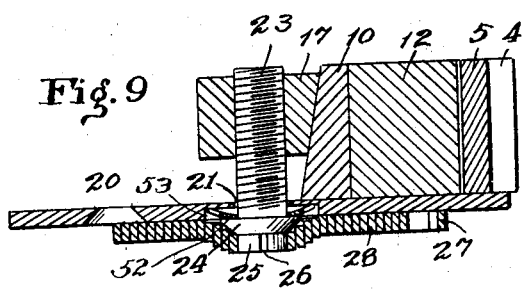
Witness
C. C. Holly.
Inventor
James Pierce Baldwin
by James R. Townsend
his atty Patented Aug. 9, 1927.

1,638,232

UNITED STATES PATENT OFFICE.

JAMES PIERCE BALDWIN, OF LOS ANGELES, CALIFORNIA.

SHOCK ABSORBER.

Application filed December 27, 1921. Serial No. 525,082.

This invention relates to a construction applicable to all types of shock absorbers operating in conjunction with vehicle springs and using screws or bolts for the regulation or maintenance of the damping effect.

The invention relates more particularly to that type of device described in my Patent No. 1,521,588 dated December 30, 1924, for a sliding clutch, adapted for use as a shock absorber, and which offers a comparatively light resistance to the compression of the vehicle spring, and comparatively greater resistance to the rebound thereof, and employs a type of moving strut described and shown in said application for producing the damping effect and controlling the amount thereof.

A feature of the invention is the use of a motor spring arranged to maintain a proper adjustment of operative parts under all conditions of wear.

Further features of invention include a means whereby the friction between the brake shoes and the surrounding annulus is more effective; means whereby the lubrication is properly distributed; more efficient means for producing the desired friction between the annulus and the brake shoes; a more effective mounting of the frictional facings to the brake shoes; and means for causing proper yielding, that is to say, to prevent seizing.

Other objects, advantages and features of invention will appear from the accompanying drawings, the subjoined detail description and the appended claims.

The accompanying drawings illustrate the invention.

Figure 1 is a plan section on irregular line $x^1$—$x^9$, Fig. 8, of a shock absorber constructed in accordance with this invention.

Fig. 2 is a reduced side elevation of the device shown in Fig. 1, omitting the cover plate and the collar-screw which secures the same in place.

Fig. 3 is an elevation of the inner side of the base detached.

Fig. 4 is a view of the cover plate detached, in the scale of Fig. 2.

Fig. 5 is a side view of one of the friction shoes shown in Figs. 1 and 8.

Fig. 6 is a perspective view of the friction face of one form of friction leather before it is bent into its shoe.

Fig. 7 is a fragmental view of another form of the friction leather.

Fig. 8 is an elevation of the friction mechanism shown in Fig. 1. The adjusting bolt and fastening screws are sectioned, and the cover plate and adjusting plate are omitted to expose parts inside the case behind said plates. The struts are shown as in operative engagement.

Fig. 9 is a fragmental detail of a modified form of the adjusting mechanism. This arrangement makes practicable the use of struts in which the angle of thrust is not predetermined.

Fig. 10 is a spring washer detached from a shock absorber having the form of adjustment shown in Fig. 9.

Fig. 11 is a perspective view of one of the tapered blocks with moving strut abutment shown in Figs. 8 and 9.

Fig. 12 is a view partly in section of one of the sound-dampening release stops for the moving struts.

I provide a friction element 1 which is shown as a case open on one side and provided with ears 2, by which it may be fastened to one of the relatively movable parts as the frame of a vehicle, not shown. The inside surface 3 of the case is machined and ground perfectly smooth to cylindrical form to be engaged by frictional facings 4 of floating shoes 5 contained in said case, which constitutes an annulus adapted to be closed at both ends.

Said facings are of suitable material to act frictionally upon said inside surface, and is preferably composed of hard sole leather, the natural surface of which has been removed, and the same is shown and claimed in United States Letters Patent, No. 1,438,527, dated December 12, 1922.

The case is provided opposite its open side with a hollow neck forming a stuffing box 6 through which extends the spindle 6' of a rotary base 7 contained in said case and provided with pairs of thrust and stop lugs 8, 8' forming radially arranged ways 9 that accommodate the floating adjusting blocks, each comprising an abutment 10 and a thrust arm 11, and also accommodating struts 12 and yielding release stops comprising the springs 13 and their seats 14.

The rim of the head 15 of base 7 is circular and of slightly less diameter than the inside of the case so as to afford a slight clearance between said rim and the case; and after the base has been assembled inside the case with stem 6' extending through and beyond the stuffing box, an internally flanged drag ring 16, which may be a metal stamping preferably of steel or iron, is pressed into place around and loosely fitting said rim; so that the head may revolve freely in the case.

The lugs are circularly arranged to practically form a central chamber $a$ within, and an annular shoe accommodating space $b$ around, said lugs, within the case.

It is preferable that the number of shoes be an uneven number so that the adjusting mechanism may be self-centered and it is preferred to employ three shoes as shown in the drawings; therefore the radial ways 9 are three in number.

The lugs 8, 8' terminate equally distant from the center of the base to accommodate the floating triangular wedge-shaped adjusting nut 17 and the inner portions of the abutments 10.

After the base and drag ring have been inserted as above described, the case is turned with the open side up and the adjusting nut 17 is inserted with the large end innermost, into the center of the open space between the inner ends of the lugs 8, 8'. Then the shoes, the blocks, the struts, and their release stops are inserted appropriately, then a flanged drag ring 18 is inserted so that the inner and outer edges of the leather facings 4 will be in contact with the flanges 19, 19' of said drag rings. Then a circular adjusting plate 20 having a central orifice 21 is inserted into the case and into the drag ring 18 and into contact with the flange 19' thereof, and is secured in place by means of flathead machine screws 22. Then the adjusting screw 23 is inserted through the central orifice 21 in the adjusting plate 20 and is screwed into the adjusting nut 17. Said floating adjusting screw is provided with a frusto-conical head 24 terminating in a mandrel 25 and provided with a slot 26. Said adjusting plate 20 is provided on its outer face with a stud 27, and a coil motor spring 28 is secured by one end in the slot 26 of the mandrel, and said motor spring is then wound tightly on the mandrel and its outer end is fixed to the stud 27 in any suitable way as by being hooked thereon as shown in the drawings.

The adjusting screw 23 is freely rotatable relative to the adjusting plate, and the tension of the spring 28 tends to turn the adjusting screw 23 in the adjusting nut 17 in the direction to force the adjusting nut outward toward the adjusting plate 20. The abutment end 10 of the adjusting block slants away from the head 15 and toward the adjusting screw and plate to conform to the adjusting nut 17 so that the movement of the adjusting nut 17 toward the adjusting plate 20 adjusts the abutments 10 toward the wall of the case, thus maintaining a snug contact of the wedge, abutments, struts, shoes and case, at all times and the tapered flat ends of the abutments 10 are so disposed with relation to the tapered flat sides of the nut 17 as to prevent the rotation of the nut upon rotation of the screw.

The taper and the thickness of the nut 17, the pitch of the screw 23 and the length of the spring 28 are such as to enable the nut to compensate for all the wear of the parts between the nut and the case, which the shock absorber is intended to take up during the life of the internal parts.

Since the flat inner face of the head 24 of screw 23 (Figure 1) bears at all times against the outer face of cover plate 20 it is not possible for the adjusting wedge 17 to move axially of the screw towards stem 6' even when the abutments 10 bear with great force against the wedge due to the action of the struts 12 in the operation of the shock absorber.

The case is internally threaded outside the adjusting plate 20 and said adjusting plate is secured in place by a threaded thrust bearing ring 29 and holds the adjusting plate 20 in true relation to the case 1 so that the head 15 is prevented from wobbling. Said thrust bearing ring is provided with seats 30 for a spanner wrench.

The open end of the case is provided with one or more notches 31 and cover plate 32 is provided with one or more projections 33 to fit into said notches to prevent rotation of said plate when brought against the thrust bearing ring 29; and said plate is also provided with an inward projection 34 which is seated in one of the spanner wrench holes 30 when the parts are assembled. Said cover plate is also concave as at 35 to accommodate the mandrel of the screw and the coils of the spring on the head of said screw. Said cover plate is secured in the case by the lock ring 36 provided with the spanner wrench seats 37.

Before the adjusting plate 20 is put into place, the cavities between the working parts in the case are filled with a suitable lubricant, and the stuffing box 6 is supplied with a packing 38 held in place by spring 39 and the gland nut 40. The lever arm 41 for connecting the spindle 6' with the second one of the relatively movable parts, not shown, the movements of which are to be controlled by the shock absorber, is fixed to the spindle 6' by any suitable means as taper fit 42, and the key 43 seated in the recess 44 and adapted to be received into the key-way 45 of the lever arm 41 which is secured against endwise movement on the spindle by the nut 46 screwed onto the end of said spindle.

In practical use the case will be secured to one of the relatively movable members by the ears 2, and the head will be connected with the other relatively movable member, not shown, by the lever arm 41.

The spring 28 is not intended, by itself, to produce any appreciable braking pressure between the friction elements. While it has been demonstrated that it is possible to use springs of such strength as will affect the resistance to movement of the parts in the free direction, it is not apparent that the strength of the spring materially affects the resistance produced in the opposite direction.

The adjusting nut 17 has a loose fit on the threaded portion of the adjusting screw 23, and the adjusting abutments 10 are arranged to slide freely in the ways 9; the purpose being to minimize friction in the adjusting mechanism, and give a floating character to the nut 17 and screw 23.

In order to properly govern the turning movement of the screw 23, and thus prevent the power in the spring 28 from forcing the struts 12 out of operative position, the stops 14 have been provided. These stops are held in place by the side walls of the ways 9 which also carry the abutments 10.

The function of these stops is thus to act in the nature of an escapement for the adjusting screw 23.

The thrust arms 11 are integral with the abutments while the stops 14 are inserts. These insert stops are recessed to carry the spiral springs 13 which serve as sound dampers on the releasing movements of the struts 12.

In practical operation the torque of the spindle is applied through thrust lugs 8, abutments 10 and thrust arms 11 to the articulation between the abutments and arms, and the inner ends of the tangential struts; so as to tend to force the struts toward a radial position, and the shoes into a predetermined frictional contact with the annulus 1.

The diameter of the hole 21 in the plate 20 is considerably greater than the diameter of the screw 23 and the space inside the lugs 8, 8' in the base 7 is considerably larger than the triangular tapered nut 17.

Thus, I provide a floating friction mechanism and provision is made for the self-centering of said adjusting nut 17 in order that any small amount of uneven disposition of the strut members 12 may be compensated for.

In Fig. 6, the active movement of the base is indicated by a solid arrow and the releasing movement by a broken arrow, the case being comparatively stationary.

When my shock absorber is in use on an automobile, the greater portion of the lubricant settles to the bottom of the absorber. The shock absorber is so mounted on the vehicle that the axis of rotation is practically horizontal and one of the shoes is at the bottom as shown in Fig. 8, and the coefficient of friction for the lowest brake shoe is therefore likely to be less than for the upper shoes on account of the superior lubrication.

I have discovered and fully determined by long experiments that this lowered coefficient of friction causes the lowest shoe to move less freely on the releasing stroke than the shoes with the higher coefficients of friction, and that, due to the self-centering feature just referred to, there is a strong tendency, on the friction stroke, for the upper shoes, with the higher coefficient of friction, to force the lower shoe, with the lower coefficient of friction, ahead; and that, unless this advance movement in the lower shoe is properly checked, the struts for the upper shoes will not properly function and the desired resistance to rotation is not produced by the brake shoes. The thrust arms 11 are therefore provided. It is not necessary that these arms 11 be located in parallelism with a radius of the base 7, the chosen location being dictated by manufacturing convenience.

In Fig. 8 which shows the struts in the operative, or fully engaged, position; it will be noted that the lower strut is in contact with an arm 11 while the upper struts are not in such contact.

The width of the space between the arms 11 and stops 14 is governed principally by the allowable self-centering movement in the triangular adjusting nut 17; that is to say; it should be small enough to prevent said nut 17 from coming in contact with the inner ends of the lugs 8 and 8', and thereby causing binding in the adjusting mechanism.

The ends of the struts are curved so as to apply pressure on the shoes at a predetermined angle of thrust.

The space between the arms 11 and stops 14 should be small enough to so confine the movement of the struts that the bearing points at the ends of the struts will always be in some part of the curved ends provided.

On the other hand, it is important that this space be wide enough to allow full relief of the struts when the shock absorber is rotated in the direction of least resistance.

The resistance to rotation being controlled by the form of strut used, stops for limiting the pressure producing movement of the struts are therefore unnecessary; the function of the arms 11 and stops 14 being to confine the articulation of the struts 12 to the curved ends thereof, to maintain a central position for the adjusting mechanism and to control the turning movement of the adjusting screw 23.

By means of means closely limiting the movement of the strut it is theoretically possible to limit the pressure produced by the operative stroke of the struts. Such an arrangement, however, is contrary to the intent and spirit of my invention, because such close limitation of strut oscillations as would be required to accurately govern the resistance produced, would demand such accuracy in manufacture as would, in the light of my experience, preclude the manufacture and sale of such a device at a profit.

The provision of a suitable lubricant for a device of this character is of the utmost importance, and such mechanical arrangement must be made as will best serve for the proper distributon of such a lubricant.

Oil films having a low superficial tension, rupture under comparatively low pressure and are therefore unsuitable as their use in my shock absorber is inclined to cause seizing and chattering.

The fixed oils having a high superficial tension and great capillarity have been found to be the most suitable, but I have also discovered that, owing to their great "oiliness" or cohesiveness, it is necessary to make some provision to insure instant engagement when the shock absorber is operated in the resistance producing direction; for otherwise, the long stroke which would be required to squeeze the surplus lubricant from between the friction surfaces would prevent the friction surfaces from having such an immediate frictional engagement as is necessary to properly damp spring rebounds.

After a great deal of experimenting, I have discovered that, in connection with the more suitable lubricants, the best results are obtained by providing hard sole leather facings 4 having cross grooves 47 which extend entirely across, or transect, the faces of such leathers.

On the engaging stroke, the sharp edges of the grooves 47 serve to scrape the surplus lubricant, which has accumulated during the preceding releasing stroke, from the frictional surface of the case 1, and the grooves themselves serve to act as outlets through which this surplus lubricant can escape. In other words, the sharp edges of the grooves act as gripping edges, causing almost an instantaneous engagement between the frictional parts. Without such grooves there is not sufficient pressure on the frictional parts, at the beginning of the frictional stroke, to promptly force out the surplus lubrication which had gathered on the preceding release stroke. On such release stroke, as pressure is relieved on the frictional parts, a degree of suction is set up by such relief which serves to a degree to flood the frictional parts with lubricant. Such suction is not induced by the grooves; in fact, is more noticeable in the absence of such grooves.

Hence, it will be apparent that the sharp edges of the grooves serve to scrape the surplus lubricant from the frictional surface of the annular member and that the openings along the edges of the facings produced by the grooving, serve as outlets through which such surplus lubricant may readily escape. It will be further apparent that, in the absence of such grooves and their sharp wiping edges, considerable pressure would be required to force out the surplus lubricant if it were of such character that the lubricating film would not readily rupture under comparatively light pressure and that, since the nature of the device is such that no considerable pressure on the frictional parts can occur until the frictional surfaces had been sufficiently cleared of surplus lubricant, the grooving is essential if the full efficiency of the entire operative stroke is to be obtained and all possibility of slippage, that is, failure to frictionally engage, is to be avoided.

In devices of this character, the coefficient for static friction should always be substantially constant. Since the co-efficient for static friction is obviously affected by the amount of lubricant on the frictional surface, mechanical means should be provided for preventing the coefficient of friction from falling below that which is essential for proper functioning and I have found sharp edged grooves the best method of obtaining this result.

With the most suitable lubricants, the grooves are preferably disposed at right angles to the sides of the facings 4; but with less suitable lubricants, that is, with lubricants which are slightly disposed to produce a chatter, the chatter can be eliminated by an angular disposition of the grooves 47 as shown in Fig. 7. Since the lubricant collects at the bottom of the shock absorber, there is a tendency toward undue resistance in the shock absorber when it is in use on comparatively smooth roads but where there are innumerable small spring movements, and practically no such movements of magnitude great enough to cause sufficient relative rotation in the shock absorber to carry a supply of lubricant to the upper frictional surface of the case 1; therefore it is necessary to provide means for insuring an ample supply of lubricant for that upper portion of the mechanism at all times.

I have experimented with separate oil compartments for each brake shoe; with wick oiling arrangements; with grooves in the case and many other schemes and have discovered that the upper portion of the case 1 can best be supplied with lubricant by means of the longitudinal groove 48 shown in Figs. 6 and 7; the action of the absorber tending to pump the lubricant from the bottom of the absorber, step by step, from one block to another, through the grooves 48, thereby, at all times, maintaining a full supply of lubricant in the spaces 49 between the facings 4 in the upper portion of the absorber when the supply of lubricant is at a low level.

It is important, in order to minimize the necessity of refilling the shock absorber with lubricant as well as to prevent the possibility of contamination of the lubricant with water or other substances, to provide means to prevent the escape of any of the lubricant.

I have discovered an improved and more economical method of mounting the friction leathers 4 on the brake shoes 5. This method is illustrated in Fig. 5.

Instead of first mounting the leather on a strip of steel for subsequent mounting on the brake shoes, I mount the leather directly to the shoe, retaining the leather in place by means of abutments shown as dovetailed projections 50 and 51.

In mounting, the leather is first softened in warm water, then bent into such an arc as will permit the ends of the leather to be inserted between the projections 50 and 51 and then pressed into place with sufficient force to accurately mold them to the outer surface of the brake shoe and to the exact curvature of the inner surface of the case.

This method overcomes the resiliency which might otherwise result from a poor fit between the metal backing formerly used and the outer surface of the brake shoe; insures a more even distribution of the pressure between the shoe and the case; accomplishes a readier conformance of the frictional face of the leather to the exact curvature of the case; and provides a cheaper method of construction.

Heretofore, there has been a tendency for the leather facings 4, as they flatten and widen incident to the pressure occasioned by use in a shock absorber, to bind against the extended rim of the base and the inner surface of the plate 20, thus producing a considerable resistance to the proper functioning of the struts in the pressure producing direction.

The flanged rings 16 and 18 overcome this difficulty by giving the frictional surface of the annular member formed by the case, the form of a channel, thus forcing the elements 4 to cling to the annular member rather than to the rotating adjusting plate 20 and the extended rim of the base 7.

In Fig 9, which shows a modified form of the adjusting mechanism, a convex spring washer 52, shown separately in Fig. 10, is located in the recess 53 of the plate 20 and under the head of the screw 23.

It has been found in devices of this character, that, unless my improved moving struts, described in my application for patent first above referred to, are used, a certain amount of resiliency is required to cause such devices to yield properly, the tendency being, otherwise, to lock rigidly on the resistance producing stroke.

I have discovered that the necessary resiliency can satisfactorily be supplied by the use of the spring member 52 as shown.

This spring member 52 functions as follows: When the struts are in the engaged or pressure producing position, there is a heavy inward pull on the head of the screw 23; the pull being in proportion to the degree of taper on sides of wedge shaped nut 17 and the corresponding taper on the backs of the abutments 10.

The spring member 52 is of such stiffness that it will begin to yield appreciably only when the predetermined pressure sufficient to produce the desired yielding frictional resistance has been reached and is of such slight curvature that, when the struts are in the released or inoperative position, said spring member 52 will be under no strain and will therefore produce no pressure on the operative parts.

Otherwise, if the spring member 52 were under constant tension, the resistance to relative rotation in the absorber would be nearly equal for either direction of rotation.

The spring member 52 is here shown in combination with a motor spring operated screw, but it is equally applicable to a manually operated screw and I do not confine my invention to the actual construction shown.

In practical use the motor or torsional, spring operates at all times to maintain a proper snug contact between the working parts by compensating for wear on such parts as rapidly as such wear takes place and avoids the necessity of any attention or exercise of judgment with respect to the required resistance and dispenses with all devices whereby the operating parts may be loosened or tightened at will.

It will be apparent that a motor spring of the "clock spring" variety is the most suitable for the purposes of my invention. I do not, however, confine myself to the particular type of spring shown and it will be obvious that any resilient member which exerts a push or pull on the periphery of the adjusting screw sufficient to set up a turning movement in the screw in the desired direction will come within the spirit of my invention.

The construction of the block comprising the abutment 10 engaging the flat slanting face 17′ of the floating adjusting means and arranged between such adjusting means and the strut, and provided at one side with the thrust arm 11, and adapted to be moved toward the shoe by said adjusting means, and to thrust the strut in one direction, obviates any tendency of the abutment to rock under the thrust of the strut.

I claim.

1. In a shock absorber having adjustable friction producing mechanism; a screw adapted and arranged to adjust such mechanism to produce a predetermined friction; and resilient means for automatically turning said screw to maintain such adjustment.

2. In a shock absorber having movement resisting mechanism, the combination with such mechanism of an adjusting mechanism operated by a screw, resilient means for turning the screw, and means to limit the extent to which said adjusting mechanism may be moved by said screw under operation of said resilient means.

3. In a shock absorber containing friction mechanism for resisting movement, adjusting means for said friction mechanism comprising a nut having tapered sides; coacting tapered blocks engaged by said nut; a screw engaged in said nut; a support for the head of the screw; and a torsion spring adapted and arranged to turn said screw.

4. In a shock absorber of the character set forth, adjusting means for the friction mechanism, comprising a wedge shaped nut; blocks engaged by said nut; a screw to move the nut; a support for the head of the screw; a motor spring adapted and arranged to turn said screw; and means to limit the extent to which said means may be moved by said spring operating through said screw.

5. In a shock absorber, two relatively rotatable members, radially movable shoes, adjustable means operatable by relative rotation of said members to move said shoes outwardly to frictionally engage one of said members, and resilient means comprising a torsion spring for maintaining said adjustable means in proper adjustment.

6. In a shock absorber, the combination with a base having radially disposed ways on one side and a spindle on the other side; of an annular case containing said base and provided with a neck through which the spindle extends; packing around the spindle; means for compressing the packing between the spindle and the inner wall of said neck; non-fluid frictional mechanism inside the case to control relative movement of the base and case; means to adjust such mechanism to a predetermined resistance and a cover to retain lubricant in said case.

7. In a shock absorber, the combination with a cylindrical wall, of brake shoes in contact with the wall, floating means between said shoes to force said shoes against said wall, an abutment for said floating means, an adjusting mechanism including an operating screw for regulating the distance between said abutments and said cylindrical wall, resilient means to limit the force applied on said shoes by said floating means, and resilient means for turning the screw.

8. In a shock absorber, the combination with an element constituting an annular shell, of a second element comprising a centrally chambered base having radial ways; floating shoes to frictionally engage the shell; a tapered nut in the chamber of the base; wedge-like abutments in the ways and articulating on the tapered nut; moving strut means between the abutments and the shoes; a screw for causing relative movements between the tapered nut and the abutments; a resilient washer under the head of the screw for governing the pressure produced by the moving strut means; and a torsion spring for turning said screw.

9. In a shock absorber comprising an annulus and shoes contacting therewith, struts and floating means to operate said shoes, adjustable means including an operating screw for regulating the distance between said floating means and said annulus, resilient means for turning said screw, and stops to limit the movements of the struts, resilient means between each strut and the stop on one side of the strut to dampen the release of said strut.

10. In a shock absorber having shoes and a frictional member having a contact face, and means to thrust the shoes toward said face; a facing for such shoes, arranged to contact with said member and transected with grooves in its contacting face to provide for the collection and egress of surplus lubricant for such faces.

11. In a shock absorber having shoes and a frictional member having a contact face, and means to thrust the shoes toward said member; leathers for such shoes, arranged to contact with said contact face and provided with sharp edged transecting grooves in its contacting face to prevent the accumulation of surplus lubricant on such contact faces.

12. In a shock absorber having shoes and a frictional member having a contact face, and means to thrust the shoes toward said member; leathers for such shoes, arranged to contact with said contact face and provided with diagonally arranged, sharp edged transecting grooves in its contacting face to prevent the accumulation of surplus lubricant on such contact faces.

13. In a shock absorber having shoes and a frictional member having a contact face, and means to thrust the shoes toward said member; facings for such shoes, arranged to contact with the contact face of said member and transectingly and longitudinally grooved for the purpose of facilitating the egress of surplus lubricant from such contact faces.

14. In a shock absorber having shoes and a frictional member having a contact face, and means to thrust the shoes toward said member; facings for such shoes, arranged to contact with the contact face of said member and provided with diagonally and longitudinally transecting grooves for the purpose of facilitating the egress of surplus lubricant from such contact faces.

15. In a shock absorber having shoes and a frictional member, and means to thrust the shoes toward said member; leathers for such shoes, arranged to contact with said member and transectingly and longitudinally grooved substantially as and for the purpose set forth.

16. In a device of the character set forth, provided with an annulus, a friction surface, and friction shoes having leather inserts with faces engaging said surface, a drag ring carried by the annulus and adapted to resist extension of the edges of said inserts.

17. In a device of the character described in combination, parallel rotatable circular members, friction shoes between said members and removable radially thereof, a cylindrical friction member coaxial with and encircling the circular members, against which the shoes may bear, and drag rings secured on the edge of said circular members respectively, for the purpose set forth.

18. In a device of the character set forth the combination with a friction shoe adjusting means, and a moving strut engaging the shoe, of a block arranged between said adjusting means and strut and provided at one side with a thrust means for the strut, and adapted to be moved toward the shoe by said adjusting means, and to laterally thrust the strut in one direction.

19. In a device of the character set forth the combination with a friction shoe, adjusting means, and a moving strut engaging the shoe, of a block arrangement between said adjusting means and strut adapted to be moved toward the shoe by said adjusting means and provided at one side with a thrust means for the strut and a stop on the opposite side of the strut adapted to limit the transverse movement of the strut away from said thrust means.

20. In a device of the character set forth the combination with a friction shoe, adjusting means, and a moving strut engaging the shoe, of a block arranged between said adjusting means and strut adapted to be moved toward the shoe by said adjusting means and provided at one side with a thrust means for the strut, a stop adapted to limit the transverse movement of the strut away from said thrust means, and a sound damping spring seated between the strut and the stop to yieldingly transmit the lateral thrust of the strut to said stop.

21. In a shock absorber, the combination with a base having radially disposed ways on one side and a spindle on the other side; of an annular case containing said base and provided with a neck through which the spindle extends; packing between the spindle and the inner wall of the neck; non-fluid frictional mechanism inside the case to control relative movement of the base and the case; adjusting means to adjust such mechanism to compensate for wear; said means comprising a screw, a tapered nut and coacting tapered abutments; resilient means for turning said screw and a cover to retain lubricant in said case.

22. A shock absorber provided with an adjusting mechanism containing a screw and resilient means for automatically turning the screw.

23. In a shock absorber, an adjusting mechanism comprising a screw and a nut; resilient means for automatically rotating one of said members and means to prevent the rotation of the other of said members.

24. In a shock absorber, a friction member having a concave contact face and a convex friction shoe adjacent thereto, undercut abutments in contact with said contact face and retained on said shoe by said abutments.

25. In a shock absorber a friction face, frictional contact devices, and an adjusting mechanism for said contact devices comprising two relatively rotatable members engaged with each other by screw threads, means for preventing the rotation of one of said members and a spring adapted and arranged to rotate through the other of said members.

26. In a shock absorber, in combination a friction face, frictional contact devices, and an adjusting mechanism for said contact devices comprising two relatively rotatable members engaged with each other by screw threads, means for preventing the rotation of one of said members and a spring adapted and arranged to rotate the other of said members, and means to limit the rotation of the spring actuated members.

In testimony whereof, I have hereunto set my hand at Los Angeles, California, this 14th day of December, 1921.

JAMES PIERCE BALDWIN.